United States Patent
Tabrizi et al.

(10) Patent No.: US 11,775,872 B1
(45) Date of Patent: Oct. 3, 2023

(54) TECHNIQUES FOR IDENTIFYING OPTIMAL EV CHARGING STATION LOCATIONS

(71) Applicant: Recentive Analytics, Inc., Boston, MA (US)

(72) Inventors: Andysheh Tabrizi, Boston, MA (US); Keeon Tabrizi, San Francisco, CA (US)

( * ) Notice: Subject to any disclaimer, the term of this patent is extended or adjusted under 35 U.S.C. 154(b) by 0 days.

(21) Appl. No.: 18/073,189

(22) Filed: Dec. 1, 2022

(51) Int. Cl.
*G06N 20/00* (2019.01)
*G01C 21/30* (2006.01)
*G06Q 30/02* (2023.01)
*B60L 53/30* (2019.01)
*G01C 21/00* (2006.01)
*G06Q 30/0201* (2023.01)

(52) U.S. Cl.
CPC ......... *G06N 20/00* (2019.01); *G01C 21/3811* (2020.08); *G06Q 30/0201* (2013.01); *B60L 53/30* (2019.02)

(58) Field of Classification Search
CPC ............... G06N 20/00; G01C 21/3811; G06Q 30/0201; B60L 53/30; B60L 701/40; B60L 701/408–411
See application file for complete search history.

(56) References Cited

U.S. PATENT DOCUMENTS

| | | | |
|---|---|---|---|
| 8,965,669 | B2 | 2/2015 | Fisher et al. |
| 9,132,742 | B2 | 9/2015 | Dai et al. |
| 9,216,654 | B2 | 12/2015 | Biedrzycki |
| 9,770,993 | B2 | 9/2017 | Zhao et al. |
| 10,083,413 | B2 | 9/2018 | Sun et al. |
| 10,300,805 | B2 | 5/2019 | Halker et al. |
| 10,464,431 | B2 | 11/2019 | Ger |

(Continued)

FOREIGN PATENT DOCUMENTS

| | | |
|---|---|---|
| CN | 104300671 A | 1/2015 |
| CN | 104866915 A | 8/2015 |

(Continued)

OTHER PUBLICATIONS

Padmanabhan et al., "Optimal Placement of Public Electric Vehicle Charging Stations Using Deep Reinforcement Learning", Electrical Engineering and Systems Science, 2022, 9 pages.

(Continued)

*Primary Examiner* — Nga X Nguyen
(74) *Attorney, Agent, or Firm* — Goodwin Procter LLP

(57) ABSTRACT

A computer-implemented method of dynamically generating a charger map for electric vehicle (EV) charger locations. The method includes providing one or more parameters for a plurality of target areas to a machine learning (ML) model. The ML model is iteratively trained to identify relationships between the parameters using historical data corresponding to the plurality of target areas. One or more target parameters for a user-specific target area are received along with one or more user-specific weights representing one or more prioritized charging features associated with the user-specific target area. A charger map is generated via the trained ML model for the user-specific target area including one or more locations for EV chargers within the user-specific target area. The charger map is optimized relative to the one or more prioritized charging features.

30 Claims, 5 Drawing Sheets

(56) References Cited

U.S. PATENT DOCUMENTS

| | | |
|---|---|---|
| 10,518,656 B2 | 12/2019 | Morris et al. |
| 10,604,027 B2 | 3/2020 | Dow et al. |
| 11,225,159 B2 | 1/2022 | Waffner et al. |
| 11,267,358 B2 | 3/2022 | Smolenaers |
| 11,325,492 B2 | 5/2022 | Viswanathan et al. |
| 11,342,602 B2 | 5/2022 | Dyer et al. |
| 11,345,245 B2 | 5/2022 | Hill et al. |
| 2012/0253655 A1* | 10/2012 | Yamada .................. B60L 58/12 340/870.07 |
| 2016/0352113 A1 | 12/2016 | Zhao et al. |
| 2020/0298722 A1 | 9/2020 | Smolenaers |
| 2021/0053456 A1 | 2/2021 | Freeling-Wilkinson |
| 2021/0221244 A1 | 7/2021 | Kuhr et al. |
| 2021/0284043 A1* | 9/2021 | Wang ...................... B60L 53/66 |
| 2022/0176840 A1 | 6/2022 | Harris et al. |
| 2022/0188729 A1 | 6/2022 | Khan |
| 2023/0024900 A1* | 1/2023 | Ayoola .................. G06N 20/00 |

FOREIGN PATENT DOCUMENTS

| | | |
|---|---|---|
| CN | 105322589 A | 2/2016 |
| CN | 108182508 A | 6/2018 |
| CN | 108764634 A | 11/2018 |
| CN | 109461025 A | 3/2019 |
| CN | 109693576 A | 4/2019 |
| CN | 110033182 A | 7/2019 |
| CN | 110175780 A | 8/2019 |
| CN | 110667428 A | 1/2020 |
| CN | 112016745 A | 12/2020 |
| CN | 112446609 A | 3/2021 |
| CN | 114819370 A | 7/2022 |
| DE | 102019208802 A1 | 12/2020 |
| EP | 2767105 A1 | 8/2014 |
| EP | 3856596 A2 | 8/2021 |
| GB | 0823475 A | 11/1959 |
| IN | 202021052901 | 4/2020 |
| IN | 202141045152 | 5/2021 |
| JP | 6169272 B2 | 7/2017 |
| JP | 6382813 B2 | 8/2018 |
| KR | 102023163 B1 | 9/2019 |
| KR | 102032554 B1 | 11/2019 |
| KR | 20210034268 A | 3/2021 |
| KR | 20210034269 A | 3/2021 |
| KR | 102259675 B1 | 6/2021 |
| KR | 102298279 B1 | 9/2021 |
| WO | WO-2011156776 A2 | 12/2011 |
| WO | WO-2022119021 A1 | 6/2022 |

OTHER PUBLICATIONS

Zhou et al., "Location optimization of electric vehicle charging stations: Based on cost model and genetic algorithm", Energy 247 (2022) 123437, 11 pages.

Wang et al., "The Location of Electric Vehicle Charging Stations based on FRLM with Robust Optimization," International Journal of Pattern Recognition and Artificial Intelligence, vol. 33, No. 08, 19 pages.

Bilal et al., "AI-based Approach for Optimal Placement of EVCS and DG with Reliability Analysis", IEEE Access PP(99):1-1, 2021, 21 pages.

Csonka et al., "Determination of charging infrastructure location for electric vehicles", Transportation Research Procedia, vol. 27, 2017, pp. 768-775.

\* cited by examiner

TECHNIQUES FOR IDENTIFYING OPTIMAL EV CHARGING STATION LOCATIONS

TECHNICAL FIELD OF THE INVENTION

In general, the subject matter of this disclosure relates to techniques for identifying locations for electric vehicle (EV) charging stations, more specifically, for identifying optimal locations for EV charging stations within a specific geographic region.

BACKGROUND

The use and ownership of electric vehicles (EVs) continues to increase amongst consumers, businesses, and public transportation services. In some cases, EV owners may charge their vehicles at home (e.g., via private chargers). Likewise, EVs that are part of a business fleet may be charged at a private service center. However, many EV owners and operators rely on public charging stations for regular charging and supplemental charging when traveling long distances. Determining where to install these EV charging stations can be difficult due to a wide variety of factors that may need to be considered (e.g., quantity of EVs within an area, available installation locations, potential operating costs, etc.). Failure to properly consider such factors can lead to sub-optimal EV charger stations that draw low usage and/or result in low revenue for EV charger station operators. In addition, such failures may limit the rate of EV adoption amongst consumers, businesses, and public transportation services.

As such, there is a need for improved systems and methods for identifying optimal locations for EV charging stations within specific geographic regions.

SUMMARY OF THE INVENTION

Elements of embodiments described with respect to a given aspect of the invention can be used in various embodiments of another aspect of the invention. For example, it is contemplated that features of dependent claims depending from one independent claim can be used in apparatus, systems, and/or methods of any of the other independent claims.

At least one aspect of the present disclosure is directed to a computer-implemented method of dynamically generating a charger map for electric vehicle (EV) charger locations. The method includes providing one or more consumer parameters for a plurality of target areas and one or more location parameters associated with the plurality of target areas to a machine learning (ML) model, where the ML model is at least one of a neural network ML model and a support vector ML model, iteratively training the ML model to identify relationships between the one or more consumer parameters and the one or more location parameters using historical data corresponding to the plurality of target areas, where such iterative training improves the accuracy of the ML model, receiving one or more target consumer parameters for a user-specific target area and one or more target location parameters for the user-specific target area, receiving one or more user-specific weights representing one or more prioritized charging features associated with the user-specific target area, providing the one or more target consumer parameters, the one or more target location parameters, and the one or more user-specific weights to the trained ML model, generating, via the trained ML model, a charger map for the user-specific target area including one or more locations for EV chargers within the user-specific target area, the charger map being optimized relative to the one or more prioritized charging features, detecting a real-time change to the one or more target location parameters, providing the real-time change to the trained ML model to improve the accuracy of the trained ML model, and updating, via the trained ML model, the charger map such that the charger map remains optimized relative to the one or more prioritized charging features in view of the real-time change to the one or more target location parameters.

Another aspect of the present disclosure is directed to a system for dynamically generating a charger map for electric vehicle (EV) charger locations. The system includes at least one memory for storing computer-executable instructions and at least one processor for executing the instructions stored on the memory. Execution of the instructions programs the at least one processor to perform operations that include providing one or more consumer parameters for a plurality of target areas and one or more location parameters associated with the plurality of target areas to a machine learning (ML) model, where the ML model is at least one of a neural network ML model and a support vector ML model, iteratively training the ML model to identify relationships between the one or more consumer parameters and the one or more location parameters using historical data corresponding to the plurality of target areas, where such iterative training improves the accuracy of the ML model, receiving one or more target consumer parameters for a user-specific target area and one or more target location parameters for the user-specific target area, receiving one or more user-specific weights representing one or more prioritized charging features associated with the user-specific target area, providing the one or more target consumer parameters, the one or more target location parameters, and the one or more user-specific weights to the trained ML model, generating, via the trained ML model, a charger map for the user-specific target area including one or more locations for EV chargers within the target area, the charger map being optimized relative to the one or more prioritized charging features, detecting a real-time change to the one or more target location parameters, providing the real-time change to the trained ML model to improve the accuracy of the trained ML model, and updating, via the trained ML model, the charger map such that the charger map remains optimized relative to the one or more prioritized charging features in view of the real-time change to the one or more target location parameters.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

As discussed above, the use and ownership of electric vehicles (EVs) continues to increase amongst consumers, businesses, and public transportation services. In some cases, EV owners or consumers may charge their vehicles at home (e.g., via private chargers). Likewise, EVs that are operated as part of a business fleet may be charged at a private service center. However, many EV owners and operators rely on public charging stations for regular charging and supplemental charging when traveling long distances. Determining where to install these EV charging stations can be difficult due to a wide variety of factors that may need to be considered (e.g., quantity of EVs within an area, available installation locations, potential operating costs, etc.). Failure to properly consider such factors can lead to sub-optimal EV charger stations that draw low usage and/or result in low revenue for EV charger station operators. In addition, such failures may limit the rate of EV adoption amongst consumers, businesses, and public transportation services.

As such, there is a need for improved systems and methods for identifying optimal locations for EV charging stations within specific geographic regions.

Figure 1:
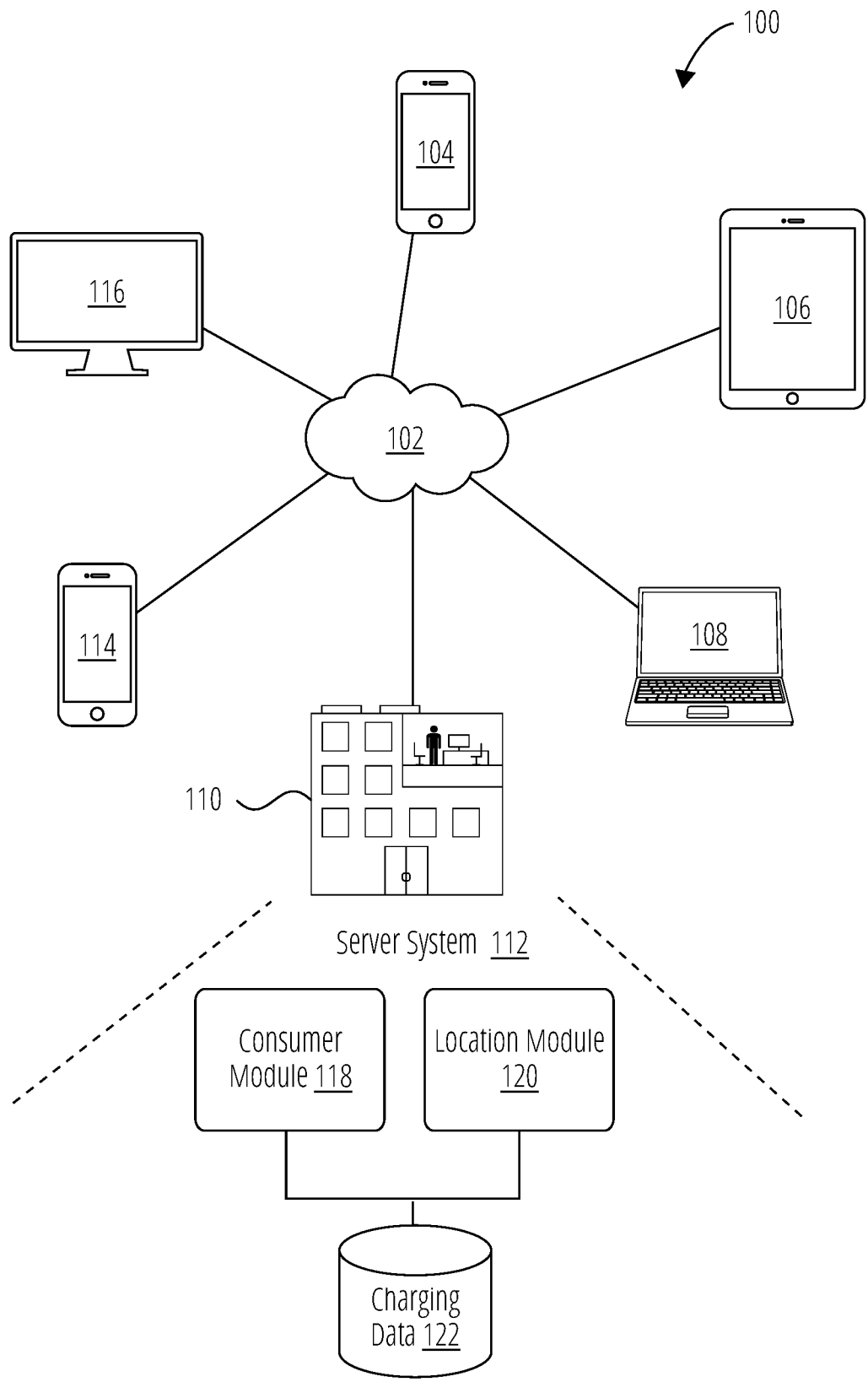
FIG. 1 illustrates a system for identifying optimal locations for EV charging stations in different geographic regions in accordance with aspects described herein.

FIG. 1 illustrates an example system 100 for identifying optimal locations for EV charging stations in different geographic regions (e.g., different cities, states, or countries). A server system 112 provides functionality for identifying locations for EV charging stations based on a variety of inputs, as described herein. The server system 112 includes software components and databases that can be deployed at one or more data centers 110 in one or more geographic locations, for example. The server system 112 software components can include, for example, a consumer module 118 and a location module 120. The server system 112 can include subcomponents that can execute on the same or on different individual data processing apparatus. The server system 112 databases can include a charging data 122 database, though it is understood that any number of databases can be included. The databases can reside in one or more physical storage systems. The software components and data will be further described below.

An application, such as, for example, a web-based or other software application can be provided as an end-user application to allow users to interact with the server system 112. The software application or components thereof can be accessed through a network 102 (e.g., the Internet) by users of client devices, such as a smart phone 104, a personal computer 116, a smart cell phone 114, a tablet computer 106, and a laptop computer 108. Other client devices are possible.

The consumer module 118 can include software components that support the software application by, for example, processing and managing data associated with consumers. For example, the consumer module 118 may monitor and forecast consumer behavior within different geographic regions. In one example, the consumer module 118 tracks the number of consumers with EVs. Likewise, the consumer module 118 may track the number of consumers without EVs. In some examples, the consumer module 118 identifies general locations where consumers are concentrated (e.g., neighborhoods, apartment buildings, etc.). The consumer module 118 may receive input parameters associated with consumers (e.g., average income, average distance to work, etc.) and predict the rate of EV adoption within different geographic regions. In some examples, the consumer module 118 may analyze factors that effect the daily travel of consumers, such as accessibility to public transit, highways, etc. In some examples, the consumer module 118 monitors traffic patterns, high-volume transit routes, highway access, and other relevant transit data associated with different geographic regions. The consumer module 118 may be configured to retrieve or otherwise obtain the data discussed above (e.g., from the charging data 122 database or another database). Alternatively, at least a portion of the data may be provided by one or more users.

Similarly, the location module 120 can include software components that support the software application by, for example, processing and managing data associated with potential and existing EV charging station locations. For example, the location module 120 may maintain a record (or map) of available EV charging station locations. Such locations may include land available for sale, businesses who have indicated interest in EV charging stations, government-owned land, etc. In addition, the location module 120 may monitor local zoning restrictions within specific geographic regions. In some examples, the location module 120 is configured to maintain a record (or map) of existing EV charging stations. The location module 120may be configured to retrieve or otherwise obtain the data discussed above (e.g., from the charging data 122 database or another database). Alternatively, at least a portion of the data may be provided by one or more users.

The charging data 122 can store and provide data for the software application and/or can provide data to or receive data from the consumer module 118 and the location module 120. The data can include, for example, information related to EVs, charging stations, installation costs, operating costs, and local installation contractors. For example, the data can include information related to charging equipment (e.g., Levels 1-3), vehicle compatibility (e.g., trickle charging, fast charging, etc.), equipment availability (e.g., timeframes associated with procurement of EV chargers), contractor availability (e.g., timeframes for completing installation), financial data (e.g., utility costs, local tax rates, insurance, etc.), or any combination thereof.

Figure 2:
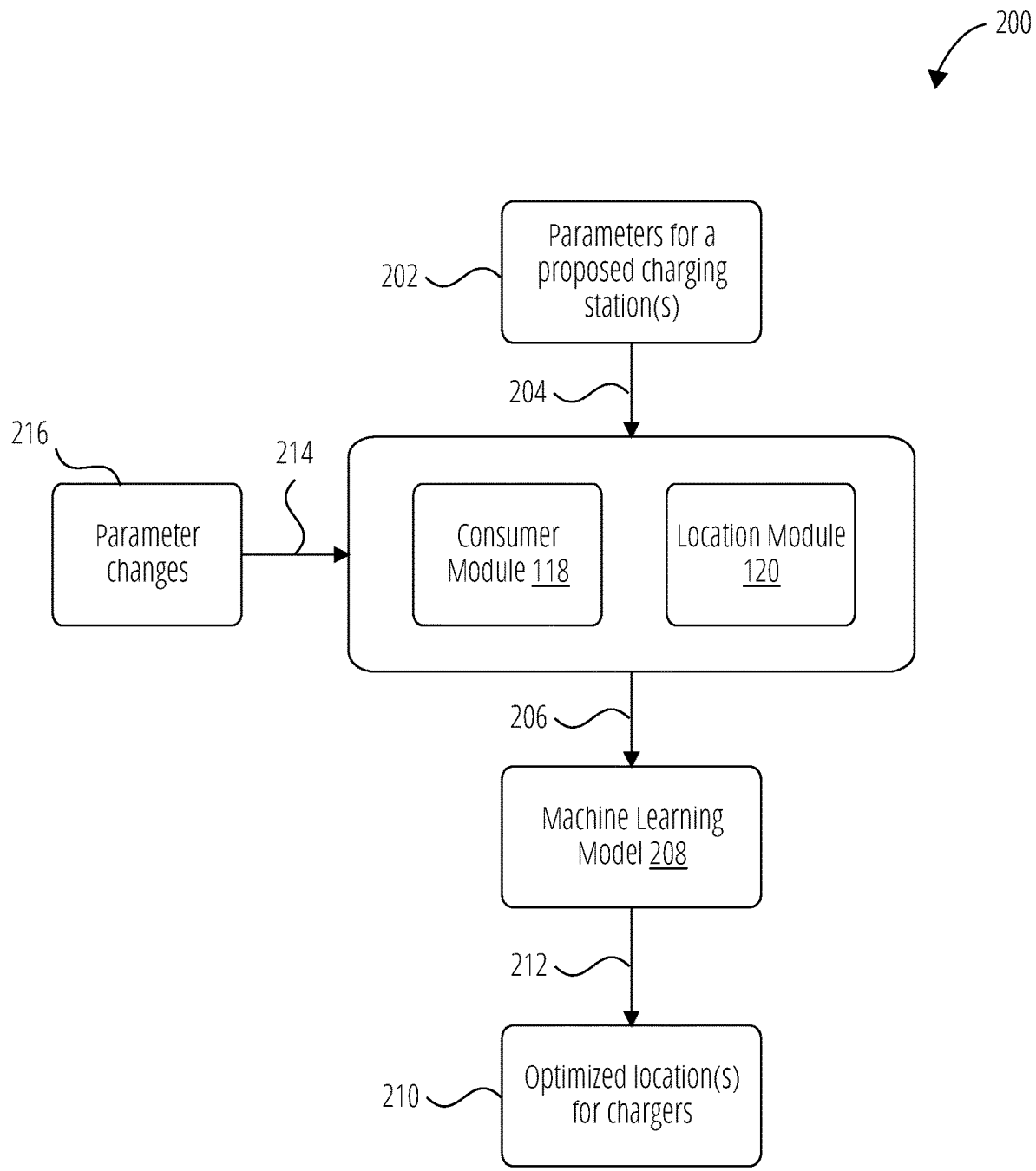
FIG. 2 illustrates a method for using the system of FIG. 1 to identify optimal locations for EV charging stations in accordance with aspects described herein.

FIG. 2 depicts an example method 200 in which the consumer module 118 and the location module 120 are used to identify optimal locations for EV charging stations (or EV chargers). Parameters 202 for one or more proposed EV charging stations are provided (test 204) as inputs to the consumer module 118 and/or the location module 120. Such input parameters 202 can be, include, or relate to, for example: a geographic region for the proposed EV charging stations (e.g., a target area), a budget for the proposed EV charging stations, a minimum number of EV charging stations, a maximum number of EV charging stations, or any combination thereof. The input parameters 202 can be retrieved from the charging data 122 database, can be manually entered by users, and/or can be retrieved from other sources (e.g., a database or website operated by a third party, such as an EV charging station operator or developer).

The parameters 202 may include one or more charging features to be prioritized when identifying the optimal locations. A user of the software application can specify the charging features that should be considered by the modules 118, 120. Such charging features can include, for example, revenue generated by the EV charging stations, profit generated by the EV charging stations, consumer accessibility (or proximity) to the EV charging stations, usage rates of the EV charging stations, installation costs for the EV charging stations, operational costs for the EV charging stations, maintenance or repair costs for the EV charger map, or any combination thereof. Additionally or alternatively, each charging feature can be assigned a weight that indicates an importance of the charging feature. For example, a user may choose to weigh revenue for a particular EV charging station more heavily than installation costs.

In the depicted example, the consumer module 118 and the location module 120 use the input parameters 202 to determine and output (step 206) corresponding consumer parameters and location parameters. For example, the consumer module 118 may retrieve and/or compile parameters associated with consumers residing in the user-specified geographic region. In one example, the consumer parameters include information associated with the number of EVs located in the user-specified geographic region. Likewise, the location module 120 may retrieve and/or compile parameters associated with potential and existing EV charging station locations within the user-specified geographic region.

In some examples, the consumer parameters, the location parameters, and the one or more charging features are provided to a machine learning (ML) model or other predictive tool. In one example, a ML model 208 is configured to generate a map 210 that indicates the optimal locations for the proposed EV charging stations (step 212). The map 210 can be or include, for example, locations for the proposed EV charging stations that optimizes, maximizes, or minimizes one or more of the prioritized charging features. For example, the ML model 208 may use the charging feature weights to identify the EV charging station locations based on particular combinations of charging features that may be of interest to the user(s).

In some embodiments, the ML model 208 is included within the consumer module 118 and/or the location module 120. In general, any suitable machine learning technique can be used, such as, for example: a gradient boosted random forest, a regression, a neural network, a decision tree, a support vector machine, a Bayesian network, other type of technique. The ML model 208 can be trained using one or more sets of training data. For example, the ML model 208 may be trained in a first stage using a first set of training data and in a second stage using a second set of training data. The training data can be or include, for example, historical data from different geographical locations or regions. Such data can include information related to the consumer parameters, the location parameters, and the charging features. In general, the ML model 208 can be trained to recognize how to optimize, maximize, or minimize one or more of the charging features based on a given set of input parameters, consumer parameters, and/or location parameters. Once trained, the ML model 208 can receive the input parameters 202, the consumer parameters, and the location parameters as input, generate the optimized map 210 of EV charging station locations, and provide the map 210 as output. To generate the map 210, the the ML model 208 can choose a location and charging configuration (e.g., number of chargers, types of chargers, station amenities, etc.) for each EV charging station.

In some examples, after the map 210 has been generated, the consumer module 118 or the location module 120 can receive or detect (step 214) one or more updates or changes 216 to the input parameters 202, the consumer parameters, or the location parameters. These parameter changes 216 can include, for instance, changes to the geographic region, budget, minimum number of EV charging stations, or maximum number of EV charging stations previously provided by the user(s). For example, the user may initially generate the map 210 as part of a bid for developing EV charging stations within the geographic region. However, as part of negotiations, the budget or scope of the development project may change. Likewise, the consumer parameters may change based on the occurrence of one or more events within the geographic region (e.g., a newly announced tax credit for EV purchases, increased gas prices, etc.). Similarly, the location parameters may change as new properties become available for sale, new EV charging stations are installed, etc.

Such a change could result in a new map 210 that is preferred over an original or previous version of the map 210. For example, the new map 210 may achieve a better optimization of one or more of the charging features (e.g., revenue, accessibility, installation costs, etc.). In some embodiments, the consumer module 118 or the location module 120 can search for and/or receive the parameter changes 216 on a regular schedule or at periodic intervals (e.g., every hour, day, week, or month). Alternatively or additionally, the modules 118, 120 can receive parameter changes 216 when prompted to do so by a user. For instance, the user can use a client device to instruct the modules 118, 120 to retrieve the parameter changes 216 and/or can enter the parameter changes 216 manually. In some examples, the map 210 can be updated based on real-time data (e.g., real-time parameter changes 216) and, in some instances, the map 210 can be dynamically updated in response to changes in this data.

Figure 3:
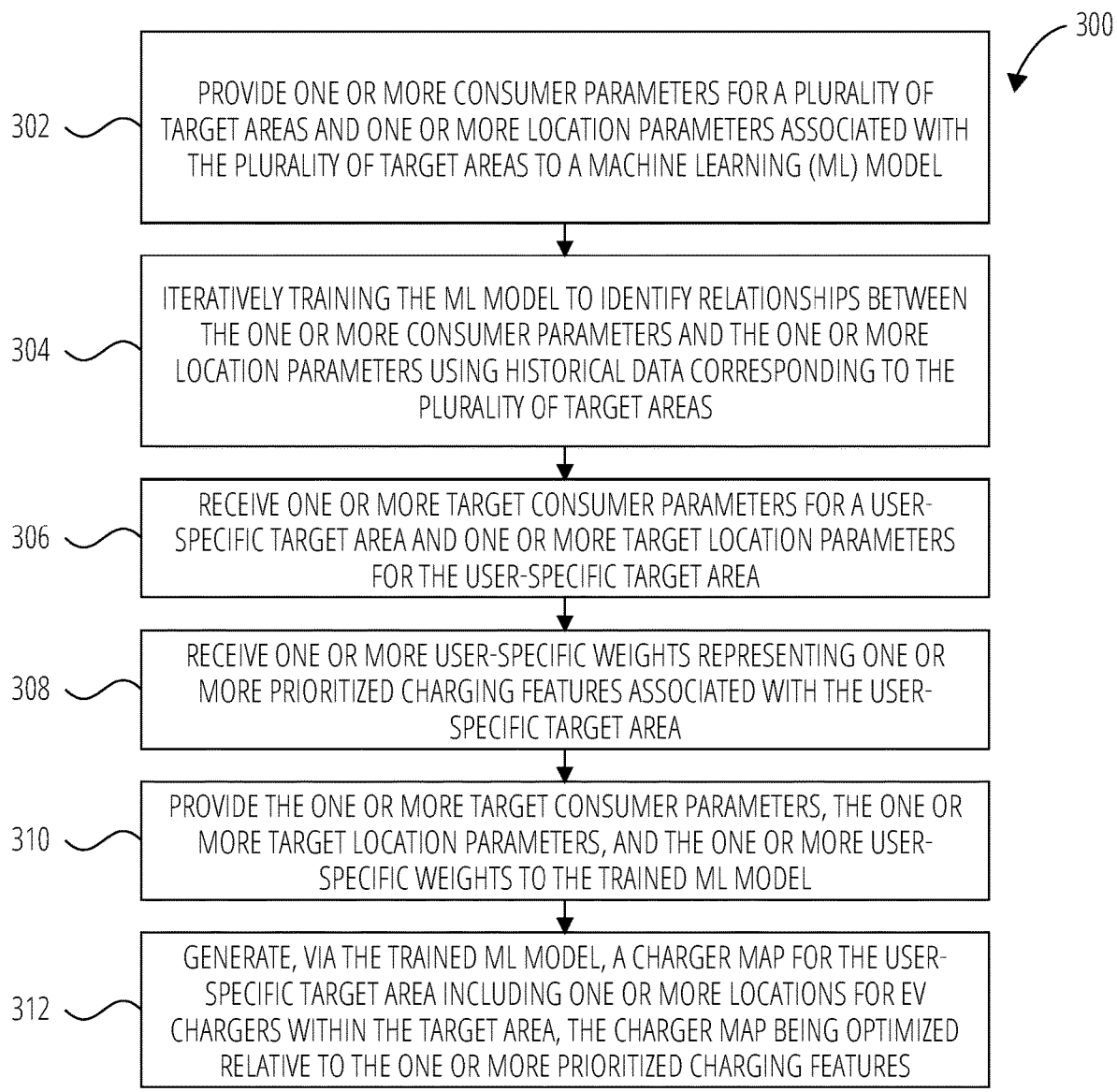
FIG. 3 illustrates a flow diagram of a method for identifying optimal locations for EV charging stations in accordance with aspects described herein.

FIG. 3 is flow diagram of a method 300 for identifying optimal locations for EV charging stations in accordance with aspects described herein. In one example, the method 300 is configured to be carried out, at least in part, by the system 100 of FIG. 1.

In block 302, one or more consumer parameters for a plurality of target areas and one or more location parameters associated with the plurality of target areas are provided to a machine learning (ML) model. In one example, the ML model (e.g., ML model 208) is at least one of a neural network ML model and a support vector ML model.

In block 304, the ML model 208 is iteratively trained to identify relationships between the one or more consumer parameters and the one or more location parameters using historical data corresponding to the plurality of target areas. In one example, such iterative training improves the accuracy of the ML model 208.

In block 306, the system 100 receives one or more target consumer parameters for a user-specific target area and one or more target location parameters for the user-specific target area.

In block 308, the system 100 receives one or more user-specific weights representing one or more prioritized charging features associated with the user-specific target area.

In block 310, the consumer module 118 and the location module 120 provides the one or more target consumer parameters, the one or more target location parameters, and the one or more user-specific weights to the trained ML model 208.

In block 312, the system 100 generates, via the trained ML model 208, a charger map for the user-specific target area including one or more locations for EV chargers within the target area. In one example, the charger map (e.g., map 210) is optimized relative to the one or more prioritized charging features.

Figure 4:
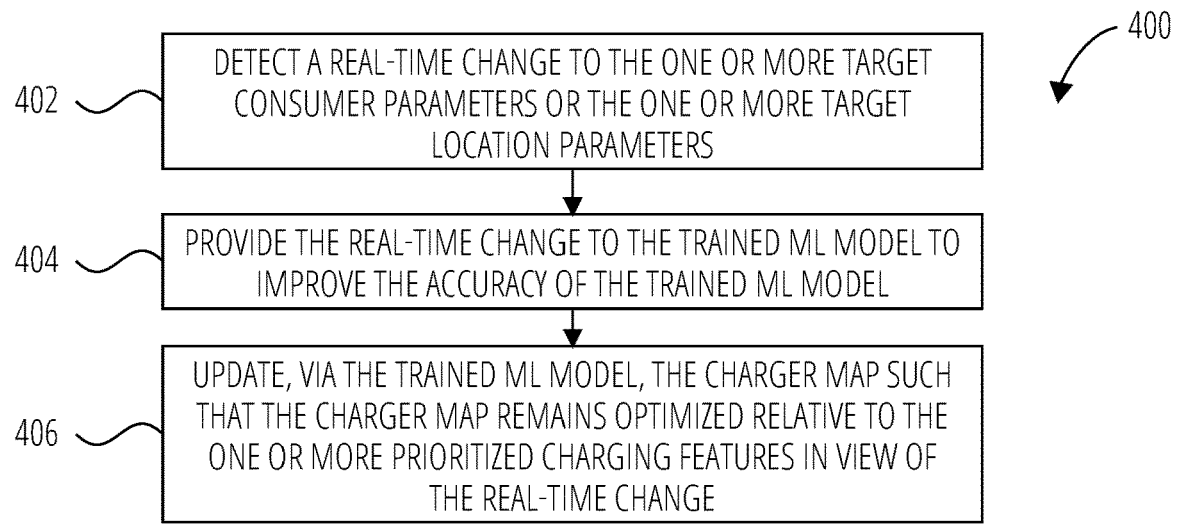
FIG. 4 illustrates a flow diagram of a method for updating a charger map in accordance with aspects described herein.

In some examples, the charger map is updated based on real-time changes received or detected by the consumer module 118 or the location module 120. For example, FIG. 4 is flow diagram of a method 400 for updating the charger map. In one example, the method 400 can be performed by the system 100 one or more times following completion of the method 300.

In block 402, the consumer module 118 or the location module 120 detects a real-time change to the target consumer parameters or the target location parameters. In one example, detecting the real-time change includes detecting an EV charger location has been added or removed within the target area. For example, the location module 120 may detect that another charging provider has installed new charging stations within the target area. Likewise, the location module 120 may detect that a potential EV charger location has been added or removed within the target area (e.g., a new plot of land has been listed for sale). The location module 120 may also detect changes to existing and potential EV charger locations. For example, the location module 120 may detect that additional chargers have been added to an existing charging station or that the size of a potential charging location has changed. In some examples, the system 100 detects a real-time change initiated by the user. For example, the user may modify the size of target area or adjust the location of the target area after the charging map has been generated.

In block 404, the consumer module 118 or the location module 120 provides the real-time change to the trained ML model 208 to improve the accuracy of the trained ML model 208.

In block 406, the trained ML model 208 updates the charger map such that the charger map remains optimized relative to the one or more prioritized charging features in view of the real-time change to the one or more target location parameters.

Figure 5:
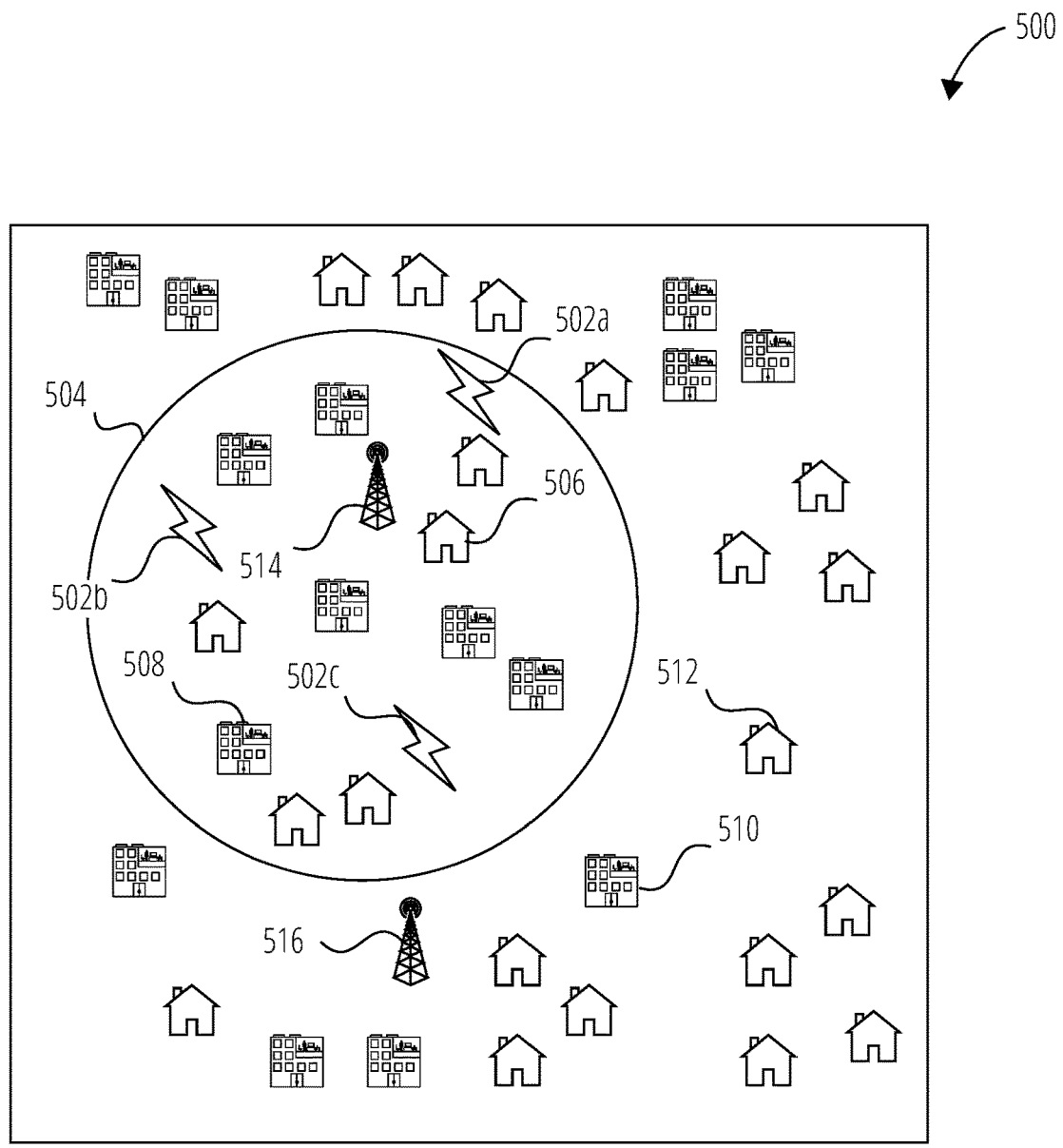
FIG. 5 illustrates an example charger map representing optimized locations for EV charging stations in accordance with aspects described herein.

FIG. 5 is an example charger map 500 representing optimized locations for EV charging stations. In one example, the system 100 of FIG. 1 is configured to generate and update the charger map 500 (e.g., via methods 300 and 400). As shown, the charger map 500 includes a plurality of charger locations 502 within a target area 504. In some examples, the target area 504 may be a state, a city, a town, a zip code, or a neighborhood. In other examples, the target area 504 may be a user-defined region. The user-defined region may have an adjustable radius that determines the size of the target area 504.

As described above, the plurality of charger locations 502 in the charger map 500 are optimized relative to the one or more prioritized charging features specified by the user(s). In order to achieve such optimization, the charger locations 502 may be selected based on different factors including: proximity to one or more residential sub-areas 506 (e.g., homes, neighborhoods, apartment complexes, etc.) within the target area 504, proximity to one or more commercial sub-areas 508 (e.g., office buildings, retail shops, movie theaters, airports, etc.) within the target area 504, proximity to one or more commercial sub-areas 510 outside the target area 504, proximity to one or more residential sub-areas 512 outside the target area 504, proximity to one or more consumer resources 514 (e.g., WiFi or cell towers) within the target area 504, proximity to one or more consumer resources 516 outside the target area 504, or any combination thereof. In addition, existing charging stations within the target area 504 and outside the target area 504 may be taken into account when generating the charger map 500.

In one example, the charger map 500 for the target area 504 is optimized to maximize at least one of revenue generated by the charging stations 502 and the usage rates of the charging stations 502. In some examples, the charger map 500 for the target area 504 is optimized to minimize at least one of installation costs and operational costs for the charging stations 502.

A graphical user interface for the charger map 500 can include one or more buttons (not shown) that allow the user(s) to reset the charger map 500, generate an output file with the charger location information, save the charger map 500, or load a different map.

Advantageously, the systems and methods described herein represent and/or achieve a significant improvement in computer functionality. For example, use of the consumer module 118 and the location module 120 (and the associated ML model 208) can improve the accuracy and/or automation of data processing. In various instances, for example, the consumer module 118, the location module 120, and the ML model 208 are developed and trained to receive a wide variety and quantity of data (e.g., the input parameters 202) and to consider a variety of charging features when generating desired or optimized charger maps. Such charger maps can be updated, as needed, when any changes to the input parameters, the consumer parameters, the location parameters, or charging features are received or detected. By training the ML model 208 to generate optimized charging maps automatically and update the charger maps dynamically, in response to real-time changes in data, the input parameters, the consumer parameters, the location parameters, and the charging features can be processed and considered more efficiently and accurately, compared to prior approaches.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic disks, magneto-optical disks, optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including, by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse, a trackball, a touchpad, or a stylus, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation.

Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Each numerical value presented herein, for example, in a table, a chart, or a graph, is contemplated to represent a minimum value or a maximum value in a range for a corresponding parameter. Accordingly, when added to the claims, the numerical value provides express support for claiming the range, which may lie above or below the numerical value, in accordance with the teachings herein. Absent inclusion in the claims, each numerical value presented herein is not to be considered limiting in any regard.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. The features and functions of the various embodiments may be arranged in various combinations and permutations, and all are considered to be within the scope of the disclosed invention. Accordingly, the described embodiments are to be considered in all respects as only illustrative and not restrictive. Furthermore, the configurations, materials, and dimensions described herein are intended as illustrative and in no way limiting. Similarly, although physical explanations have been provided for explanatory purposes, there is no intent to be bound by any particular theory or mechanism, or to limit the claims in accordance therewith.

What is claimed is:

1. A computer-implemented method of dynamically generating a charger map for electric vehicle (EV) charger locations, the method comprising:
    providing one or more consumer parameters for a plurality of target areas and one or more location parameters associated with the plurality of target areas to a machine learning (ML) model, wherein the ML model is at least one of a neural network ML model and a support vector ML model;
    iteratively training the ML model to identify relationships between the one or more consumer parameters and the one or more location parameters using historical data corresponding to the plurality of target areas, wherein such iterative training improves the accuracy of the ML model;
    receiving, via a user interface, a user-specific target area;
    obtaining, via at least one first data source, one or more target consumer parameters for the user-specific target area and one or more target location parameters for the user-specific target area;
    receiving, via the user interface, one or more user-specific weights representing one or more prioritized charging features associated with the user-specific target area;
    providing the one or more target consumer parameters, the one or more target location parameters, and the one or more user-specific weights to the trained ML model;
    generating, via the trained ML model, a charger map for the user-specific target area including one or more locations for EV chargers within the user-specific target area, the charger map being optimized relative to the one or more prioritized charging features;
    detecting a real-time change to the one or more target location parameters by monitoring at least one second data source associated with the user-specific target area;
    providing, via a network, the real-time change to the trained ML model to improve the accuracy of the trained ML model; and
    updating, via the trained ML model, the charger map such that the charger map remains optimized relative to the one or more prioritized charging features in view of the real-time change to the one or more target location parameters.

2. The method of claim 1, wherein the user-specific target area is one of a state, a city, a town, a zip code, or a neighborhood.

3. The method of claim 1, wherein the user-specific target area is a user-defined region.

4. The method of claim 3, further comprising:
    receiving, via the user interface, a real-time change to the user-specific target area;
    providing the real-time change to the trained ML model to improve the accuracy of the trained ML model; and
    updating, via the trained ML model, the charger map such that the charger map remains optimized relative to the one or more prioritized charging features in view of the real-time change to the user-specific target area.

5. The method of claim 4, wherein the user-specific target area has a user-defined radius.

6. The method of claim 5, wherein the real-time change to the user-specific target area includes a change to the user-defined radius.

7. The method of claim 1, wherein the one or more target consumer parameters include information associated with at least one of consumers residing in the user-specific target area and a number of EVs located in the user-specific target area.

8. The method of claim 1, wherein the one or more target location parameters include information associated with at least one of potential EV charger locations and existing EV charger locations within the target area user-specific.

9. The method of claim 1, wherein the one or more prioritized charging features include revenue, consumer accessibility, usage rates, installation costs, operational costs, or any combination thereof.

10. The method of claim 9, wherein generating the charger map for the user-specific target area that is optimized relative to the one or more prioritized charging features comprises generating a charger map that maximizes at least one of revenue and usage rates.

11. The method of claim 9, wherein generating the charger map for the user-specific target area that is optimized relative to the one or more prioritized charging features comprises generating a charger map that minimizes at least one of installation costs and operational costs.

12. The method of claim 1, wherein detecting the real-time change to the one or more target location parameters includes detecting that at least one of an EV charger location and a potential EV charger location has been added or removed within the user-specific target area.

13. The method of claim 1, wherein the one or more locations for EV chargers in the charger map include locations for one or more EV charging stations having a plurality of EV chargers.

14. The method of claim 1, wherein the one or more locations for EV chargers in the charger map include locations for one or more discrete EV chargers.

15. A system comprising:
a user interface;
at least one memory for storing computer-executable instructions; and
at least one processor for executing the instructions stored on the memory, wherein execution of the instructions programs the at least one processor to perform operations comprising:
providing one or more consumer parameters for a plurality of target areas and one or more location parameters associated with the plurality of target areas to a machine learning (ML) model, wherein the ML model is at least one of a neural network ML model and a support vector ML model;
iteratively training the ML model to identify relationships between the one or more consumer parameters and the one or more location parameters using historical data corresponding to the plurality of target areas, wherein such iterative training improves the accuracy of the ML model;
receiving, via the user interface, a user-specific target area;
obtaining, via at least one first data source, one or more target consumer parameters for the user-specific target area and one or more target location parameters for the user-specific target area;
receiving, via the user interface, one or more user-specific weights representing one or more prioritized charging features associated with the user-specific target area;
providing the one or more target consumer parameters, the one or more target location parameters, and the one or more user-specific weights to the trained ML model;
generating, via the trained ML model, a charger map for the user-specific target area including one or more locations for EV chargers within the target area, the charger map being optimized relative to the one or more prioritized charging features;
detecting a real-time change to the one or more target location parameters by monitoring at least one second data source associated with the user-specific target area;
providing, via a network, the real-time change to the trained ML model to improve the accuracy of the trained ML model; and
updating, via the trained ML model, the charger map such that the charger map remains optimized relative to the one or more prioritized charging features in view of the real-time change to the one or more target location parameters.

16. The system of claim 15, wherein the user-specific target area is one of a state, a city, a town, a zip code, or a neighborhood.

17. The system of claim 15, wherein the user-specific target area is a user-defined region.

18. The system of claim 17, wherein execution of the instructions programs the at least one processor to perform operations further comprising:
receiving, via the user interface, a real-time change to the user-specific target area;
providing the real-time change to the trained ML model to improve the accuracy of the trained ML model; and
updating, via the trained ML model, the charger map such that the charger map remains optimized relative to the one or more prioritized charging features in view of the real-time change to the user-specific target area.

19. The system of claim 18, wherein the user-specific target area has a user-defined radius.

20. The system of claim 19, wherein the real-time change to the user-specific target area includes a change to the user-defined radius.

21. The system of claim 15, wherein the one or more target consumer parameters include information associated with at least one of consumers residing in the target area and a number of EVs located in the target area user-specific.

22. The system of claim 15, wherein the one or more target location parameters include information associated with at least one of potential EV charger locations and existing EV charger locations within the target area user-specific.

23. The system of claim 15, wherein the one or more prioritized charging features include revenue, consumer accessibility, usage rates, installation costs, operational costs, or any combination thereof.

24. The system of claim 23, wherein generating the charger map for the user-specific target area that is optimized relative to the one or more prioritized charging features comprises generating a charger map that maximizes at least one revenue and usage rates.

25. The system of claim 23, wherein generating the charger map for the user-specific target area that is optimized relative to the one or more prioritized charging features comprises generating a charger map that minimizes at least one installation costs and operational costs.

26. The system of claim 15, wherein detecting the real-time change to the one or more target location parameters includes detecting that at least one of an EV charger location and a potential EV charger location has been added or removed within the user-specific target area.

27. The system of claim 15, wherein the one or more locations for EV chargers in the charger map include locations for one or more EV charging stations having a plurality of EV chargers.

28. The system of claim 15, wherein the one or more locations for EV chargers in the charger map include locations for one or more discrete EV chargers.

29. The method of claim 1, wherein the at least one first data source and the at least one second data source are the same data source(s).

30. The system of claim 15, wherein the at least one first data source and the at least one second data source are the same data source(s).

* * * * *